(No Model.)

W. RADY.
SEPARATING APPARATUS.

No. 419,067. Patented Jan. 7, 1890.

Witnesses.
Arthur Ashley
P. E. Stevens.

Inventor.
William Rady.
W. E. Stevens.
Atty.

UNITED STATES PATENT OFFICE.

WILLIAM RADY, OF SELLERSBURG, INDIANA.

SEPARATING APPARATUS.

SPECIFICATION forming part of Letters Patent No. 419,067, dated January 7, 1890.

Application filed September 23, 1889. Serial No. 324,854. (No model.)

*To all whom it may concern:*

Be it known that I, WILLIAM RADY, a citizen of the United States, residing at Sellersburg, in the county of Clark and State of Indiana, have invented certain new and useful Improvements in Separating Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of separators which are designed to separate those particles of cement or other similar material which are already fine enough from the coarser parts and lumps which require further reduction; and its object is to provide simple and effective means for accomplishing such separation while the coarse and fine parts are sliding in bulk toward the stone which is to reduce the coarse part, the said coarse part being directed by the separator to the eye of the stone and the fine part to the periphery of the stone, where the coarse part, after being properly ground, will unite with that already fine.

To this end my invention consists in the construction and combination of parts forming a "separator," hereinafter described and claimed, reference being had to the accompanying drawings, in which—

Figure 1:
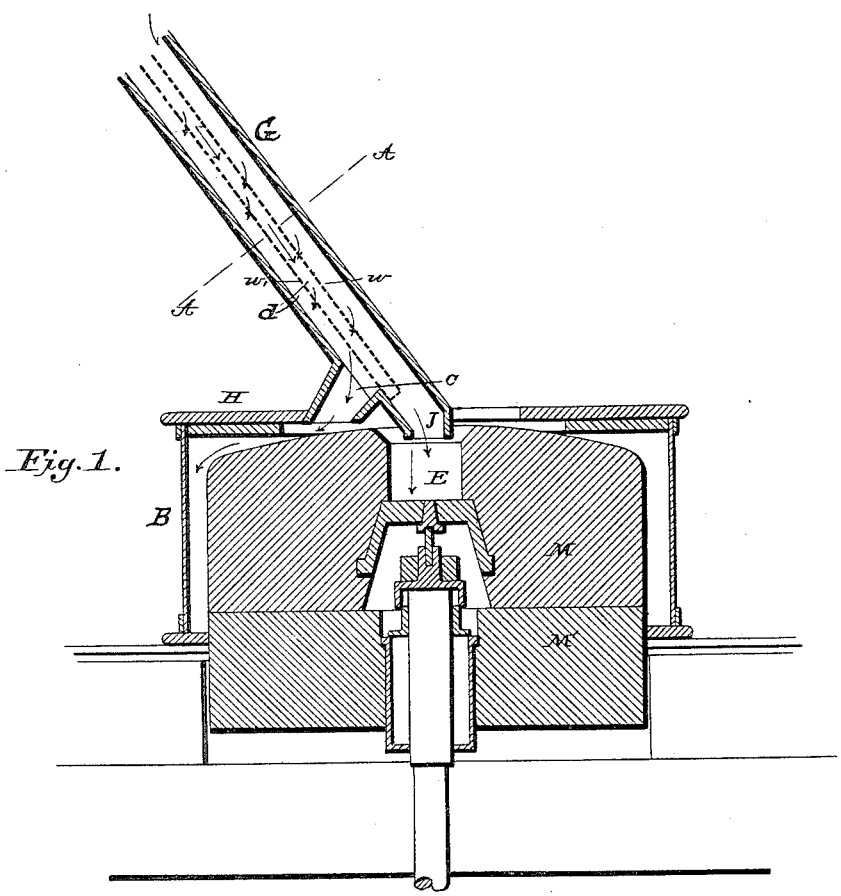
Figure 2:
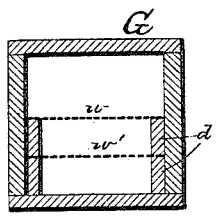

Figure 1 is a vertical section of my separator shown ready for service in connection with a millstone. Fig. 2 is a cross-section at the broken line A A, Fig. 1.

M M' represent, respectively, the upper and lower millstones, E the eye in the center of the upper stone, and B the skirt surrounding both.

G represents a slanting spout, whose main delivery is at J into the eye of the stone, and whose side delivery is at C on top of the stone. The lower end of the spout may be supported by a cover H, resting on the stone skirts, or by other means.

$w\ w'$ represent two screens of wire-cloth or other reticulated material, placed one above the other, both passing over the outlet C, but not extending to the outlet J. These screens may be provided with sides $d$ to keep them in proper relation to each other and to the spout, and so that either or both may be bodily drawn up out of the spout for any purpose.

In operation the cement is admitted to the spout G above the screen $w$, on which all the coarse part slides freely down into the eye of the stone, while the fine part passes through the screen $w$, also through the screen $w'$ to the bottom of the spout, on which it slides to the outlet C to the top of the stone, which works it to the circumference, both by the centrifugal force of the revolving stone and by the outward slant of the top of the stone. Thus the coarse part will be ground by the stone and worked toward the skirt, as usual, where it will rejoin the part already fine; but the coarse heavy part, in sliding down the top screen $w$, is likely to force many particles through the screen which should not go through it, and which, of their own weight, would not go through. I have therefore provided a second screen $w'$ below the first, where the heavy part never comes, and the part arrested thereby is also carried to the eye of the stone to the ground.

A great advantage is gained by this method of treating cement: first, the stone is not clogged by the fine part, which does not need grinding, and it will do a great deal more work as a result; second, the cement is sure to be properly refined and will sell for a higher grade than it would if my double screen were not used.

Having thus fully described my invention, what I believe to be new, and desire to secure by Letters Patent, is the following:

1. The combination of a millstone or other pulverizer, a spout having two outlets, one of which delivers to the eye of the stone and the other to the skirts or outlet of the stone, and two screens placed within the spout, one above the other, and extending over the second-named outlet, substantially as shown and described.

2. The combination of a millstone, an inclined spout having its lower end communicating with the eye of the said stone, a side discharge-spout communicating with the top of the stone, and two screens located one above the other in the said spout and extending across the side discharge-spout, substantially as shown and described.

In testimony whereof I affix my signature in presence of two witnesses.

WILLIAM RADY.

Witnesses:
P. C. BARTH,
D. McMULLEN.